J. F. RUNKLE.
GEAR SHIFTING MECHANISM.
APPLICATION FILED JAN. 30, 1917.
1,252,305.
Patented Jan. 1, 1918.
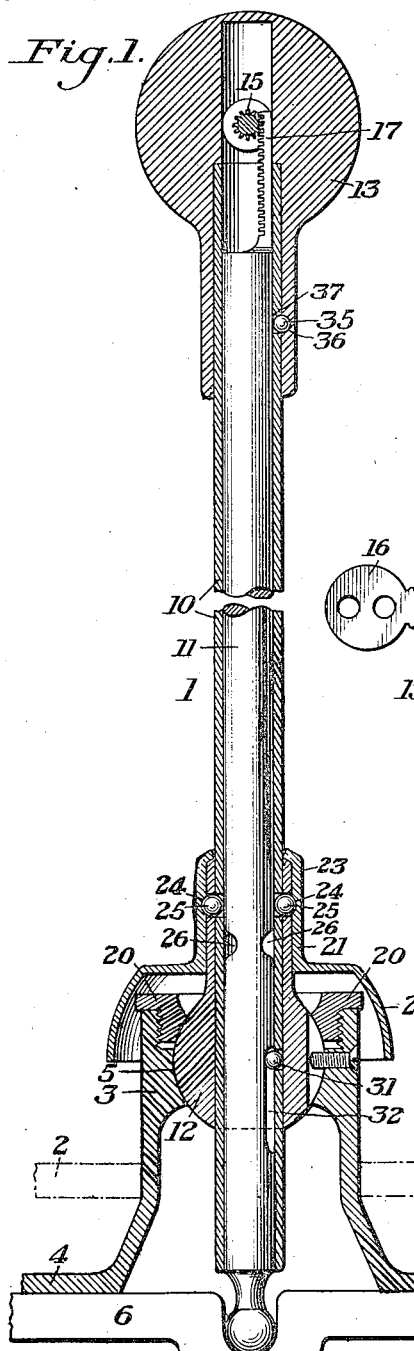
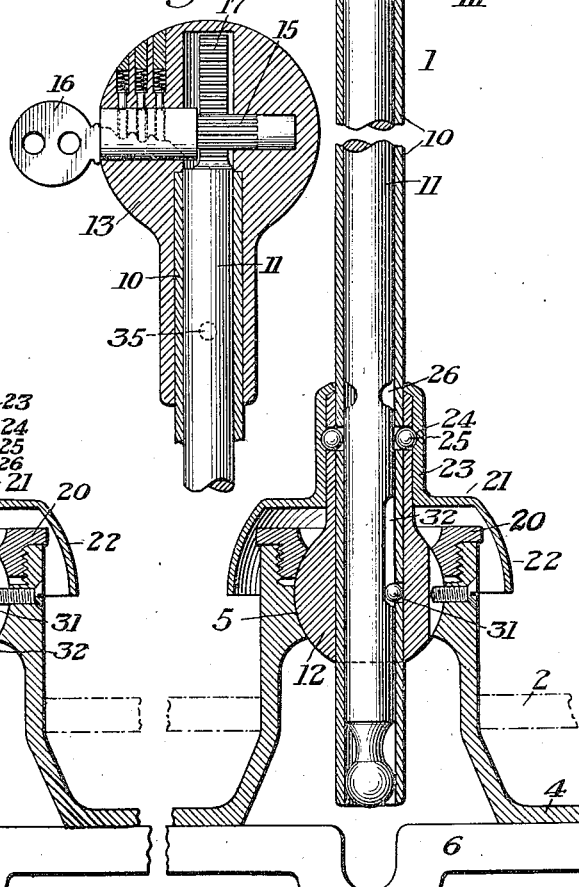
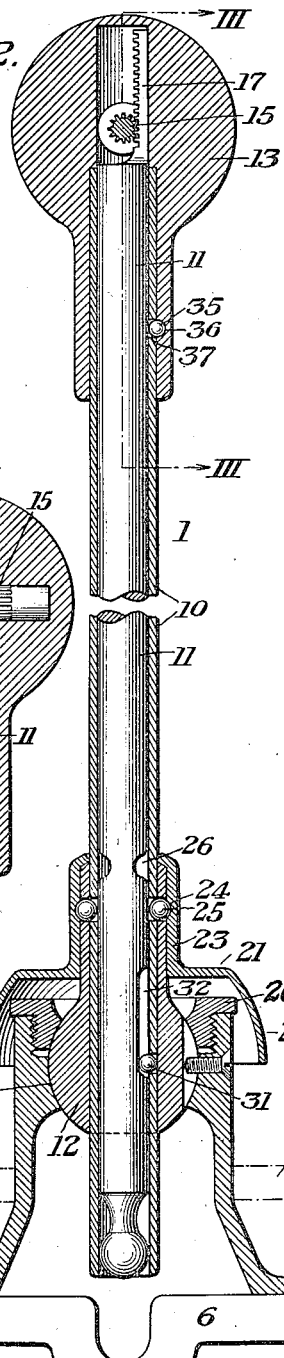
WITNESSES
INVENTOR
Jno. F. Runkle

UNITED STATES PATENT OFFICE.

JOHN F. RUNKLE, OF CLEVELAND, OHIO.

GEAR-SHIFTING MECHANISM.

1,252,305.  Specification of Letters Patent.  Patented Jan. 1, 1918.

Application filed January 30, 1917. Serial No. 145,438.

*To all whom it may concern:*

Be it known that I, JOHN F. RUNKLE, a citizen of the United States, residing at Cleveland, in the county of Cuyahoga and State of Ohio, have invented a new and useful Improvement in Gear-Shifting Mechanism, of which the following is a full, clear, and exact description, reference being had to the accompanying drawings, forming part of this specification, in which—

Figure 1 is a vertical section through the gear shifting lever, showing the parts in operative position.

Fig. 2 is a similar vertical view showing the parts locked in inoperative position, and Fig. 3 is a detail section taken along the line III—III of Fig. 2 showing the lock.

The object of the invention is to produce a simple but secure mechanism for locking an automobile so that it cannot be started. With this object in view, the present invention consists in the gear shifting mechanism, and particularly the means for locking the same as hereinafter described and particularly pointed out in the claims.

Referring to the illustrated embodiment of the invention, reference numeral 1 indicates the usual gear shifting lever projecting above the floor 2 of the automobile. The lever is mounted in the usual socket neck 3 carried on the top of the gear case 4. The lever is provided with the usual ball-and-socket connection 5 which permits it to be moved back and forth and from side to side to shift the gears. The gear shifting fork or member 6 is engaged and moved by the lower end of the shifting lever to shift the gears, as will readily be understood by those skilled in this art. The lever 1 comprises an outer sleeve 10 and an inner core or rod 11. The outer sleeve 10 is removably secured in the ball member 12 of the ball-and-socket joint 5. On the upper end of the sleeve 10 is the usual knob or handle 13 which is grasped by the operator.

The rod or core 11 is arranged to be reciprocated up and down. When the rod 11 is down, as shown in Fig. 1, the lever 1 is operatively connected with the gear shifting fork 6. When the rod 11 is in its raised position, as shown in Fig. 2, the shifting lever 1 is disconnected from the gear shifting fork 6, so that the gears cannot be shifted. The rod 11 is raised or lowered by a locking device inclosed in the knob 13. In the embodiment of the invention illustrated in the drawings, this locking device consists of a pinion 15 turned by a key 16 and engaging a rack 17 carried on the end of the rod 11. The illustrated locking device is only one type of mechanism which may be employed to raise and lower the rod, and it is to be understood that other mechanism might be employed. As shown in the drawings, one complete turn of the key 16 will move the rod 11 from raised to lowered or from lowered to raised position. After the rod 11 is positioned, the key 16 is removed and the mechanism cannot be tampered with until the key is again inserted.

On leaving the car the operator shifts the gears to neutral position, turns the key 16, thus disconnecting the lever from the gear shifting fork and removes the key. The car is thus locked against starting, as will be readily understood by those skilled in this art.

The parts are so arranged that when the lever is locked it is impossible to take the lever apart. This will prevent persons having some mechanical skill from removing the lever and shifting the gears by the insertion of some tool. The gear shift lever is held from removal by the bushing or sleeve 20 which is threaded in the top of the socket neck 3 and engages the ball 12. A cover or cap 21 is provided which incloses the sleeve 20 to prevent its removal. The cap 21 has a flange 22 extending down and covering the sleeve 20, and a sleeve portion 23 which extends along the upper end of the ball member 12. In the inside of the sleeve portion 20 are recesses 24 which are engaged by locking balls 25. Registering holes are cut through the upper portion of the ball member 12 and through the sleeve 10 to receive the balls 25. When the rod 11 is in either its raised or lowered position, the balls 25 are held outwardly in the recesses 24 thus locking the cover 21 against removal. By moving the rod 11 to the halfway position, the balls 25 are allowed to drop into the recesses 26 in the rod and permit the removal of the cover 21. The balls 24 also serve to lock the sleeve 10 and the ball member 12 together. The movement of the rod 11 is limited by a ball 31 held in a hole through the sleeve 10 and engaging the slot 32 in the side of the rod 11. This ball may be removed after the lever is taken out of the ball member 12 to permit the rod 11 to be slid out of the sleeve 10, if desired. The knob or handle 13 is locked in position by means of ball 35 which is held in a recess 36 in the lower sleeve-like extension by the knob 13 and a registering hole 37 through the sleeve 10. The knob 13 cannot be removed except by first taking the lever out of the ball member 12, removing the rod 11 from sleeve 10, thus permitting the ball 35 to be removed from its recess. It will thus be seen that it is impossible for any unauthorized person to take the gear shifting mechanism apart, because only by first turning the key 16 to move the rod 11 to its half-way position can the parts be released so as to be disassembled.

It will thus be seen that the lever is provided with a disconnectible element, such as the rod 11, and that this disconnectible element is not only locked in a disconnected position, as shown in Fig. 2 of the drawings, but is also locked in an inaccessible position, because, as shown in the drawings, when the lever is locked, the retaining balls prevent its being taken apart.

While the preferred embodiment of the invention has been illustrated and specifically described, it is to be understood that the present invention is not limited to its illustrated embodiment, but may be employed in other structures within the scope of the following claims.

I claim:

1. Gear shifting mechanism for automobiles and the like having a shifting lever provided with a disconnectible element, and means for locking said element in a disconnected and inaccessible position, substantially as described.

2. Gear shifting mechanism for automobiles or the like having a shifting lever provided with a slidable rod normally operatively engaging a gear shifting member, means for moving the rod out of engagement with said member and for locking it in disconnected position, and means for locking the parts of the lever against disassembling when the rod is locked, substantially as described.

3. Gear shifting mechanism for automobiles or the like having a shifting lever provided with a sleeve and a rod slidably inclosed in said sleeve and normally engaging a gear shifting fork, said lever being provided with a handle at its upper end, and locking means in said handle for moving the rod out of operative connection with the gear shifting fork, substantially as described.

4. Gear shifting mechanism for automobiles or the like having a shifting lever provided with a sleeve and a rod slidably inclosed in said sleeve and normally engaging a gear shifting fork, said lever being provided with a handle at its upper end, locking means in said handle for moving the rod out of operative connection with the gear shifting fork, and retaining means controlled by the position of the rod for preventing the removal of the lever so as to prevent the lever from removal when the rod is locked in its disconnected position, substantially as described.

In testimony whereof, I have hereunto set my hand.

JOHN F. RUNKLE.

Witnesses:
 KARL F. MELCHER,
 BESSIE H. SMITH.